(12) United States Patent
Mizzi

(10) Patent No.: US 8,395,271 B2
(45) Date of Patent: Mar. 12, 2013

(54) PASS-THROUGH PTO MECHANISM FOR RENEWABLE ENERGY SYSTEMS

(76) Inventor: John V. Mizzi, Poughkeepsie, NY (US)

( * ) Notice: Subject to any disclaimer, the term of this patent is extended or adjusted under 35 U.S.C. 154(b) by 335 days.

(21) Appl. No.: 12/807,953

(22) Filed: Sep. 17, 2010

(65) Prior Publication Data

US 2011/0077113 A1    Mar. 31, 2011

Related U.S. Application Data

(60) Provisional application No. 61/277,852, filed on Sep. 30, 2009.

(51) Int. Cl.
*F03B 13/10* (2006.01)
(52) U.S. Cl. .............................. 290/43; 290/54
(58) Field of Classification Search ................. 290/1 C, 290/1 R, 43, 54
See application file for complete search history.

(56) References Cited

U.S. PATENT DOCUMENTS

| | | | | |
|---|---|---|---|---|
| 1,482,713 A * | 2/1924 | Stein | ............................. | 192/48.7 |
| 3,746,875 A * | 7/1973 | Donatelli | ......................... | 290/42 |
| 5,324,988 A * | 6/1994 | Newman | ........................ | 290/54 |
| 6,555,931 B2 | 4/2003 | Mizzi | | |
| 6,969,926 B2 * | 11/2005 | Conlon | ........................... | 290/55 |
| 7,791,213 B2 * | 9/2010 | Patterson | ....................... | 290/53 |
| 2010/0032950 A1 * | 2/2010 | Akervoll | ......................... | 290/53 |
| 2010/0102563 A1 * | 4/2010 | Akervoll | ......................... | 290/53 |
| 2010/0207392 A1 * | 8/2010 | Bender | ............................. | 290/53 |

* cited by examiner

*Primary Examiner* — Tho D Ta
(74) *Attorney, Agent, or Firm* — Alfred M. Walker

(57) ABSTRACT

A pass-through power take-off (PTO) mechanism for use with renewable energy systems is described to extract power from a linearly moving tether under high tension and to convert it to rotary power such as for driving an electric generator. Three such embodiments are described. The first uses two adjacent timing belts and transfers power from tether to PTO via friction. The second embodiment uses two adjacent roller chain loops and a mechanical engagement method to transfer power from tether to PTO. The third embodiment uses two adjacent double-sided timing belts and either a synchronous or an asynchronous method to transfer power from the tether to the PTO.

20 Claims, 6 Drawing Sheets

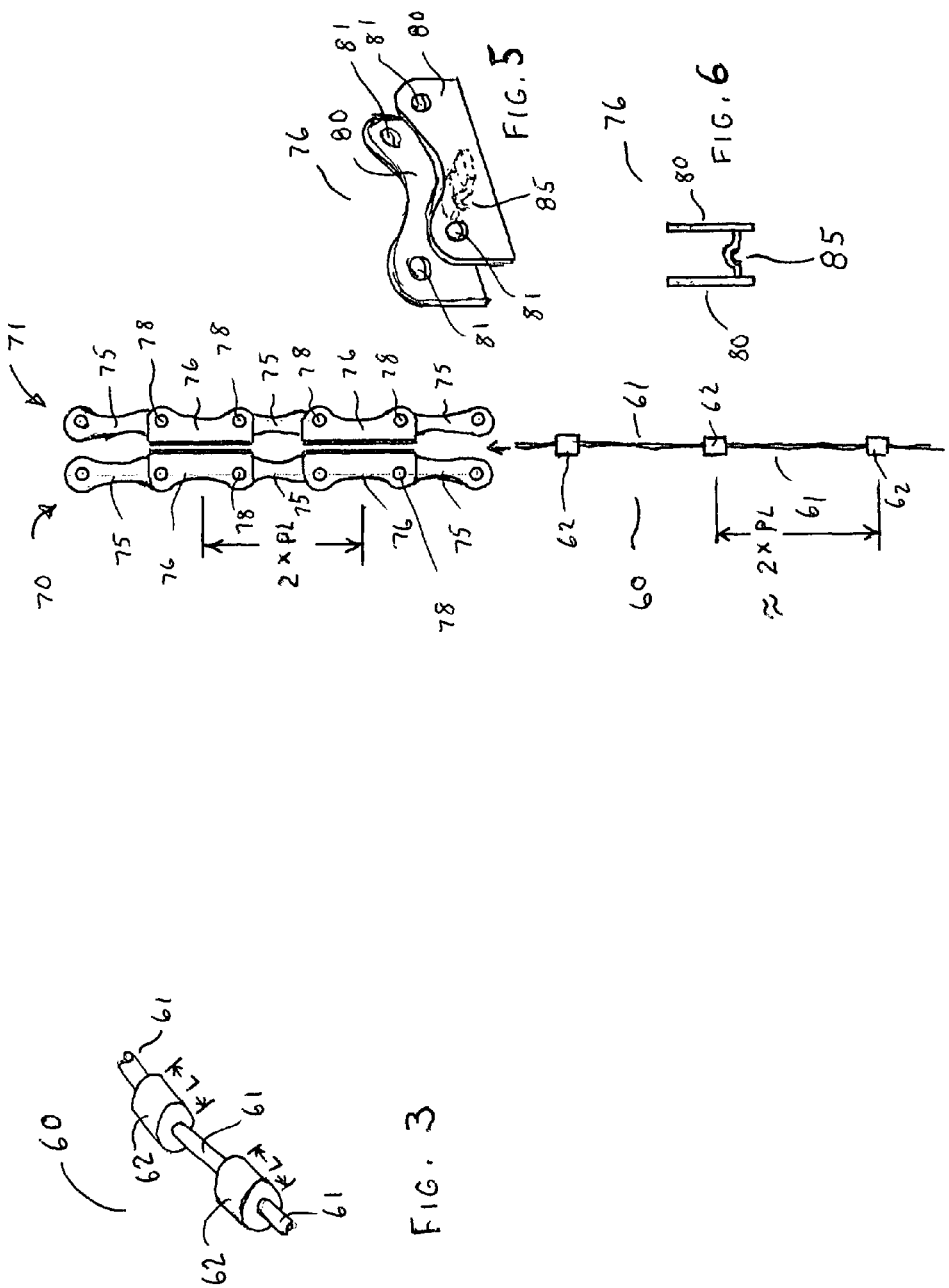

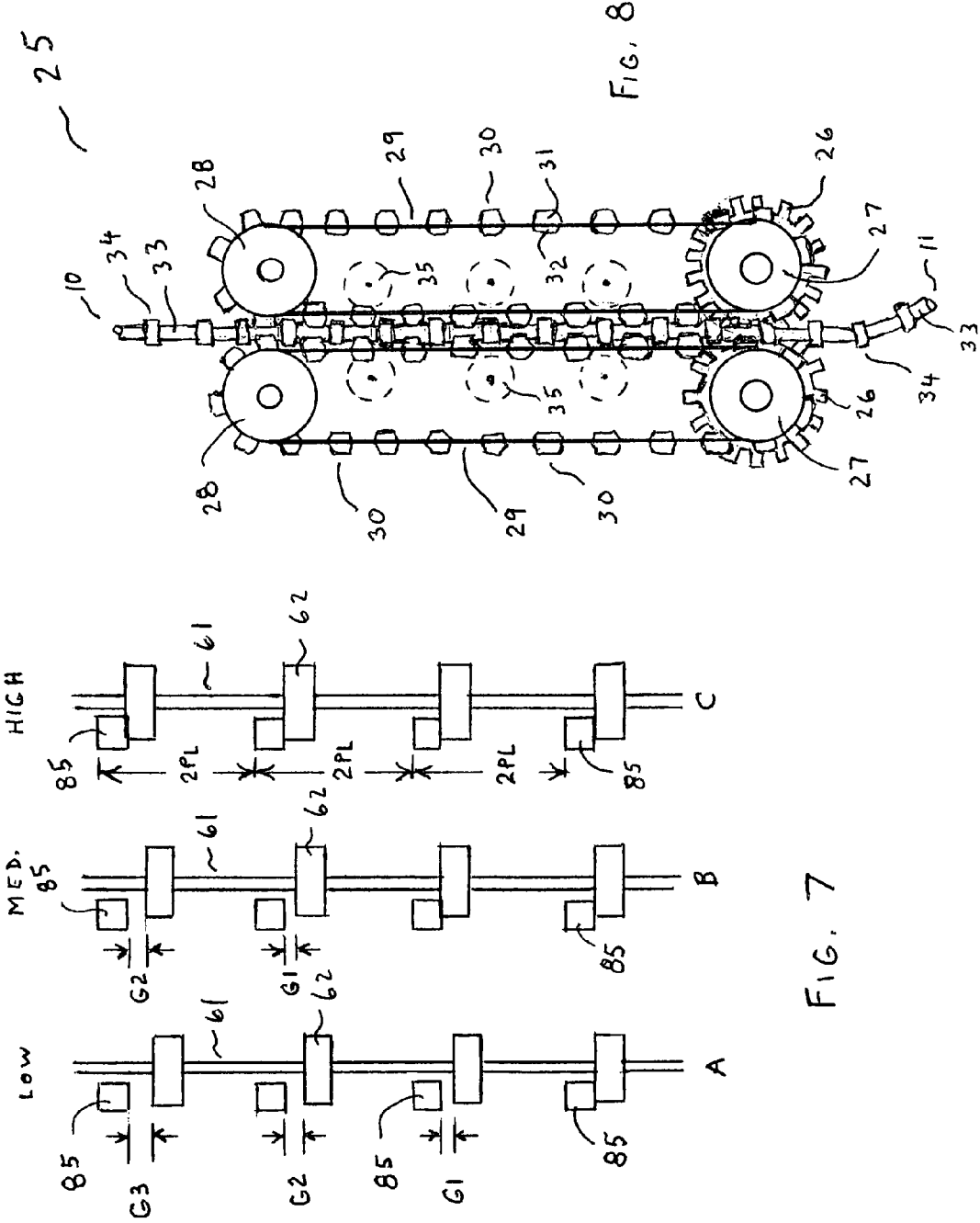

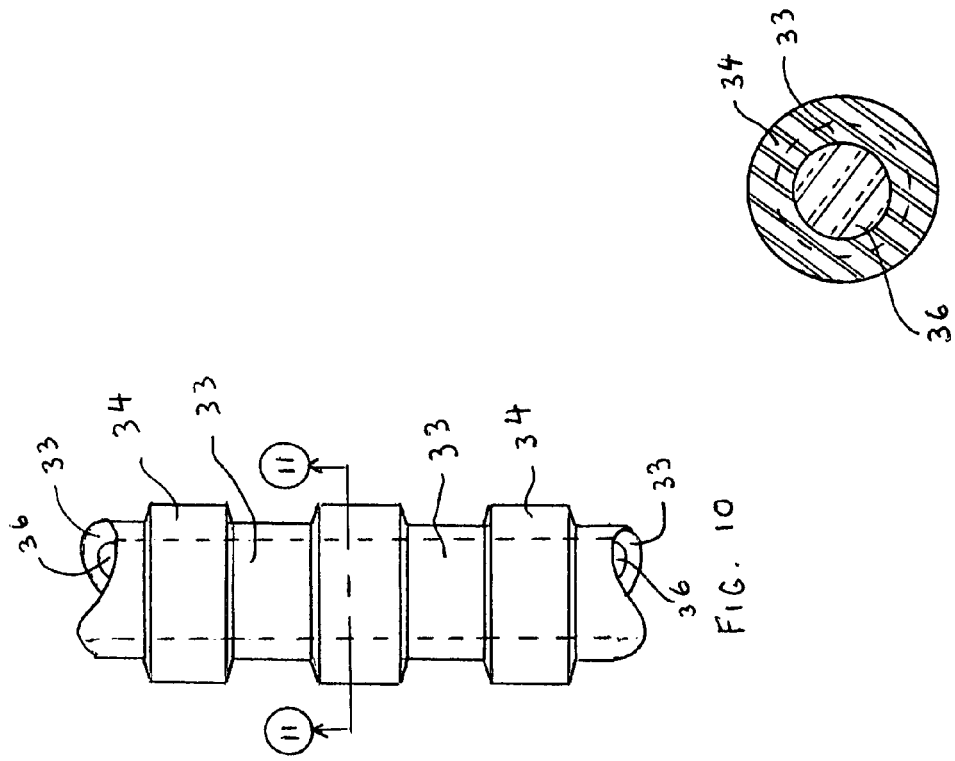
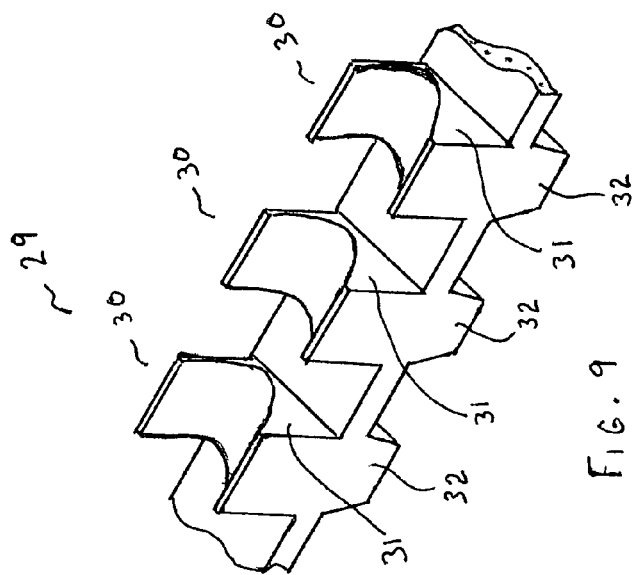

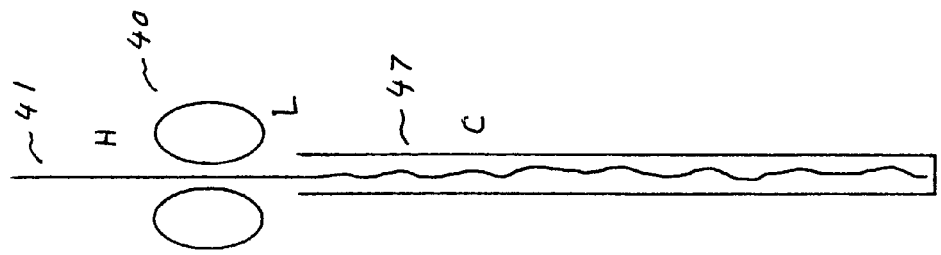
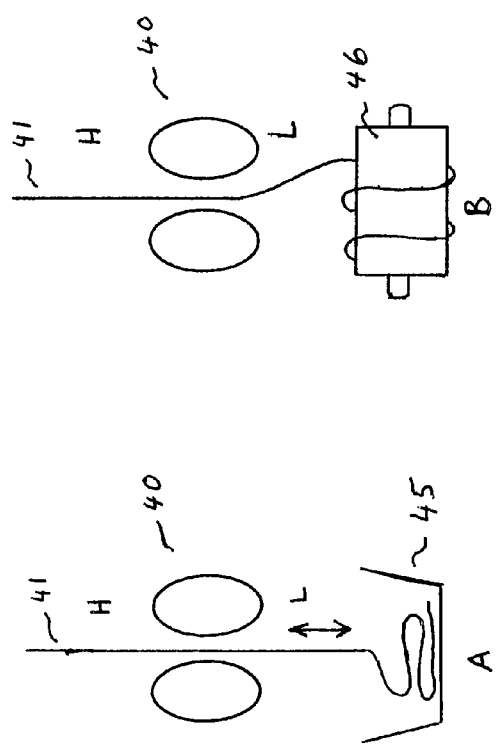
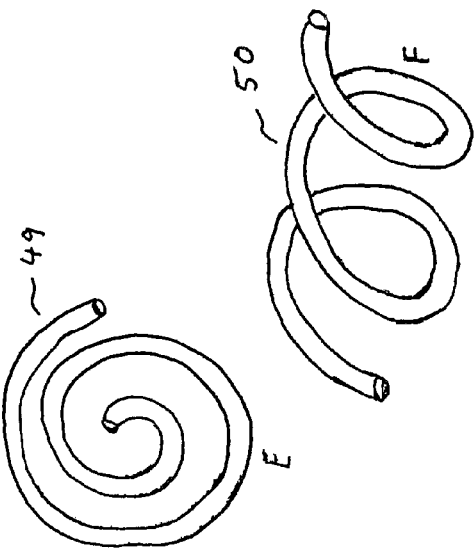
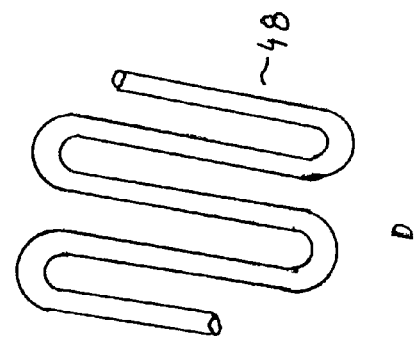
FIG. 12

PASS-THROUGH PTO MECHANISM FOR RENEWABLE ENERGY SYSTEMS

CROSS REFERENCE TO RELATED APPLICATION

The invention described and claimed herein below is described in substance within U.S. Provisional Patent Application No. 61/277,852, filed on Sep. 30, 2009, which provides a claim of priority of invention under 35 U.S.C. 119(e). This application is incorporated by reference herein.

FIELD OF THE INVENTION

The present invention relates to a power take-off (PTO) mechanism for extracting rotary power from a linearly moving tether passing therethrough in renewable energy systems.

BACKGROUND OF THE INVENTION

My U.S. Pat. No. 6,555,931 describes renewable energy systems of a non-turbine variety using long-stroke reciprocating motion of one or more tethers each attached to an element extracting useful energy from naturally occurring fluid flow of air (wind) or water (currents or tides). U.S. Pat. No. 6,555,931 is incorporated by reference herein.

Wind turbines are being deployed at a rapid pace both on land and off-shore. Land use, push-back by local populace, land cost, and site-specific avian mortality problems have limited terrestrial development of wind farms. This has spurred interest in developing large off-shore wind farms. In shallow areas, turbine towers are attached to the seabed, but the interest in less congested and more remote deep-water areas increases as close off-shore shallow venues have also come under attack.

Regarding very large deep-water off-shore wind energy development, economies of scale point to ever increasing turbine size making the installation and very logistics of transporting tower and blade sections problematic. With turbine-tip speed limits and even taller structures to contend with, it is interesting that using oil platform technology or counter-weighted ocean floor tethered floating platforms are considered (by some) to be both cost-effective and practical.

Actually, large reciprocating wind energy systems may be more compatible with the task at hand. The main attraction for deep-water use is the elimination of the tower structure with its attendant turning moment transmitted to the supporting structure. The installation would be at sea-level since only airfoils would be aloft. A floating platform can be totally fitted at dockside and just towed to its deployed area; it can also be moved to shore for any major repairs (or they can be easily and safely performed at sea). Since all components of a reciprocating wind system are modular and relatively small (airfoils can be "folded"), there is no transportation problem. No special vessels with cranes are required for erection, deployment, or maintenance/repairs. There are no known size limitations comparable to those imposed by turbine blade root stress or blade tip speed, so that size can be more easily dictated by economic as opposed to technology considerations.

However, there are some problems in scaling up power drums, capstan, or windlass type tether handling devices for long-stroke systems that would be handling tethers of several inches diameter and under extremely high tension. These devices are used to convert the linear tether motion into more useful rotary motion. If very large diameters are used, rotary speed will be slow thereby increasing the cost of transmission components. If strokes are limited to mitigate this problem, system efficiency suffers.

OBJECTS OF THE INVENTION

It is, therefore, an object of the present invention to provide a pass-through PTO arrangement handling tether under tension linearly thereby avoiding the need for winding the tether under tension.

It is a further object of this invention to provide a pass-through PTO arrangement compatible with non-turbine long-stroke reciprocating renewable energy systems.

It is also an object of the present invention therefore to provide a viable alternative to very large deep-water off shore wind turbines with life-cycle cost and safety advantages from deployment throughout service life.

Other objects which become apparent from the following description of the present invention.

SUMMARY OF THE INVENTION

This invention replaces power drum, capstan, or windlass devices with a pass-through PTO mechanism that can be scaled up to accommodate large diameter tether under high tension to convert linear motion of the tether to rotary motion at advantageous rotary speed as compared to the prior art devices. This invention can be used in large reciprocating renewable energy systems such as wind energy conversion systems or water current or tidal systems. While most of the discussion is involved with extracting power from a moving tether to the PTO during the power stroke, the pass-through PTO is also used to supply power to the tether during the low-power rewind phase in the opposite direction.

In some embodiments, a modified lower portion of tether slightly longer than the maximum stroke length is used as compatible with the pass-through PTO mechanism. In other embodiments, the standard tether as that used for the portion beyond the maximum stroke length can be used unmodified. Although tethers with circular crossection are described in this application, it can be appreciated that other crossectional shapes such as oval or flat ribbons can be used with very slight modifications of the pass-through PTO mechanisms for their accommodation without departing from the operation or concept described. Even in the case of modified tethers, the average density is close to that of the unmodified tether so as not to impede proper operation of the unmodified upper portion of tether. This can be achieved in a variety of manners including differences in crossectional shape and size, material, elasticity and compressibility from that of the upper tether even if at the penalty of increased unit cost for this short lower section.

In the first embodiment, a frictional approach is used to transfer the tether motion to the PTO mechanism. Two timing belts supported by timing belt pulleys at the top and bottom are placed side-by-side such that the outer surface of one belt is slightly less than the thickness of the tether from the outer surface of the adjacent belt. Either the outer smooth surfaces of both timing belts or outside of the lower portion of the tether (>stroke length) has a surface enhanced to increase the coefficient of friction. Both the belts and tether can be friction enhanced if desired. If the tether is slightly deformed so that it can squeeze between the adjacent belts and be locked to them by friction, it will drive both belts if it moves linearly in either direction. The two lower timing belt pulleys (one engaged in each belt) are also coupled to each other by an attached gear so that the two belts will move synchronously and extract power from the moving tether which can be harvested as rotary motion of either one (or both) of the gear shafts. Actually, power extraction can be either at the top (high tension) end or the bottom (no tension) end as the power stroke commences upward, but the lower end is preferred as it automatically pulls the belt segments taut. Smaller idler timing belt pulleys are deployed along the surface adjacent to the tether on each belt to maintain some squeeze pressure against the tether. Power is thereby transferred from the tether to the output gears along approximately one half of each belt length. The limitation on the diameter of timing belt pulleys used is that the diameter has to be able to engage enough power transfer ridges of the belt to accommodate the forces on the belt. The smallest diameter pulley that exceeds this criteria without slippage (or "jumping" a ridge) would be used to achieve the highest possible rotary speed for a given tether velocity. Note also that a rewind motor can be selectively engaged with either gear shaft to pull the tether back down (as might be used during the parasitic portion of the stroke of returning a closed airfoil to a lower position in a wind energy application).

The second embodiment uses a mechanical engagement to transfer power from a moving tether to the PTO. Using a geometric configuration not unlike the first embodiment, two loops of roller chain replace the function of the timing belts. Sprockets replace the timing belt pulleys. The lower portion of the tether (>stroke length) is enhanced with the attachment of chain engaging members at the appropriate pitch to mesh with nibs attached to the roller chain. By judicious selection of the pitch of the engaging members on the tether as compared with the constant pitch of the roller chain nibs, multiple engagement along the roller chain will be insured thereby limiting point source stress loading of both tether and chain.

The third embodiment of this invention uses a specially designed timing belt which can be used to engage tether in either a synchronous or asynchronous method. The two timing belts used are "double-sided" with the design of the outer engagement blocks with a concave contour designed to grasp an unmodified or a "sleeve modified" tether in an asynchronous method, or a tether with periodic engagement rings molded onto its periphery. The asynchronous method would slightly deform the tether outer contour of an unmodified tether or one that has been overmolded with a smooth sleeve (such as polyurethane) so that a combination of friction and mechanical deformation will engage the tether within the concave portion of the belt engagement blocks. In the alternate method, the same concave portion will engage synchronously (mechanically) engagement rings overmolded onto the tether. Since the elastic stretch of the tether and belts can be designed to be the same, the pitch of the engagement rings and the outer engagement blocks can also be the same.

The pass-through PTO divides the tether into a high tension section above the PTO and a no-tension section below. In between, as tether passes through, tension is transferred from tether to PTO where it is converted into torque at the power output. While the tether under high tension, is not easy to handle, the no-tension lower end of the tether can be easily handled in a number of ways. It can simple fall into a bin from which it can be pulled up, it can be wound onto and unwound from a light-weight drum, or it can be pushed into and pulled from any rigid hollow tubing structure with either no or gentle curvature.

BRIEF DESCRIPTION OF THE DRAWINGS

The present invention can best be understood in connection with the accompanying drawings. It is noted that the invention is not limited to the precise embodiments shown in drawings, in which:

FIG. 3 is a perspective detail of the modified tether of the second embodiment.

FIG. 4 is a side elevation detail of the central region of the two roller chain central sections of pass-through PTO with modified outer side links.

FIG. 5 is a perspective view of one double-sided outer roller chain link of the second embodiment.

FIG. 6 is an end view of the link of FIG. 5 showing the crossover member.

FIG. 7 is a schematic representation of the relative position of tether engagement elements and chain crossover members under low, medium, and high tether tension conditions at A, B, and C respectively.

FIG. 8 is a side elevation of a pass-through PTO of this invention according to the third embodiment using a specially designed timing belt.

FIG. 9 is a perspective close-up of a section of timing belt of the PTO of FIG. 8.

FIG. 10 is a side elevation close-up of tether over molded with mechanical engagement rings.

FIG. 11 is a crossection of the tether of FIG. 10.

FIG. 12 is a schematic representation of several methods of handling the no-tension end of tether: A. bin, B. drum, C. straight tube, D. flat serpentine, E. flat spiral, F. helix

DETAILED DESCRIPTION OF THE INVENTION

Figure 1:
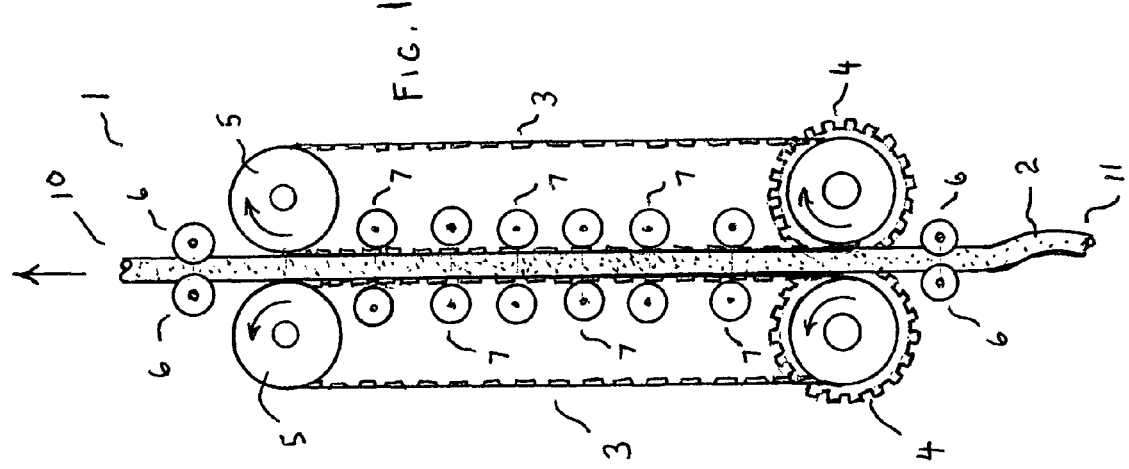
FIG. 1 is a front elevation of the pass-through PTO of this invention according to the first embodiment using a frictional power transfer from tether to PTO.

FIG. 1 shows pass-through PTO mechanism 1 using timing belts 3, timing belt idler pulleys 5 at the top and timing belt pulleys with attached synchronizing gears 4 at the bottom. Tether 2 passes through PTO 1 in intimate contact with outer sides of both timing belts 3 along one side each. Motion of tether is upward (power stroke) with end 10 at high tension and lower end 11 at no tension. Tether 2 passes through two pairs of highly grooved idler pulleys 6 to locate it between belts 3. Pulleys 4 and 5 are turned in the indicated directions by virtue of tether 2 motion and the effects of being squeezed between belt 3 sections with high friction at the tether/belt junction. This friction is caused by frictional coefficient enhancement of either the outer surfaces of both belts 3 or of the outer periphery of tether 2 or both. This can be achieved by material selection (eg.—high friction polyurethane material or coating) or the use of adhesively attached high friction grains of abrasive material that would embed in the opposite contact surface. Small timing belt idler pulley pairs 7 help keep tether 2 in intimate contact with belts 3. Idler pulleys 7 should have flanges (not shown to enhance clarity) to help locate tether 2 centrally transversely between belts 3.

Figure 2:
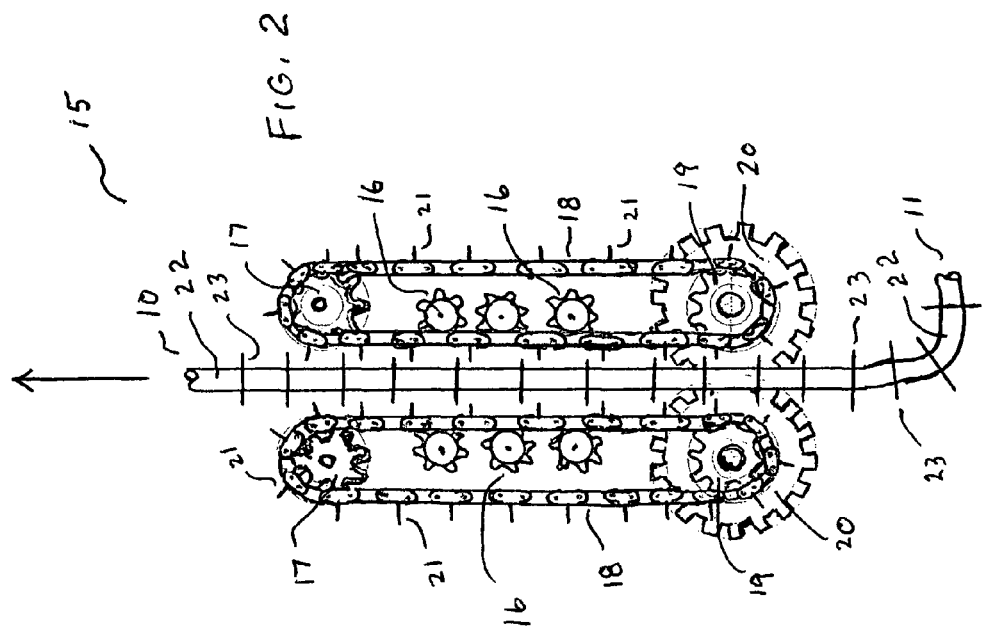
FIG. 2 is a front elevation of a pass-through PTO using mechanical engagement and roller chain according to the second embodiment.

FIG. 2 shows schematically pass-through PTO 15 using two roller chain loops 18 engaging modified tether 22 mechanically whereby attached tether disks 23 engage chain nibs 21. Roller chain 18 is located by upper idler sprockets 17 and lower sprockets 19 attached to synchronizing gears 20. Intermediary idler sprocket pairs 16 help keep tether 22 and chains 18 engaged. Roller chains are relatively easy to scale up to enormous sizes and power ratings since there is much experience in their use in very large construction, mining, and maritime equipment. For this reason, this second embodiment is preferred. The mechanical engagement between tether 22 and chains 18 results in higher transmission efficiency. Roller chains, if properly lubricated, are known to offer long trouble-free service life.

FIGS. 3-7 show practical details of the elements of PTO 15 of FIG. 2. FIG. 3 shows the preferred embodiment of modified tether 60 with actual tether fiber 61 and short tubular members 62 replacing the tether disks 23 of FIG. 2. Depending on the materials selected for tubular members 62 and tether fiber 61, elements 62 can be directly over-molded onto tether fiber 61 in a continuous fabrication method. In any case, the length L provides more internal surface area (than a disk shape) for bonding with the outer surface of fiber 61 even if adhesives are used.

FIG. 4 shows the central region of pass-through PTO 15 using roller chain with modified outer links of the preferred embodiment. Both the left chain loop 70 and the right chain loop 71 are identical. They are made up of standard inner links 75 and modified double outer links 76 which are attached via rivets or other coupling elements 78. Links 76 are spaced at double the chain pitch lengths. FIGS. 5 and 6 show details of a double link 76. Two side flanges 80, with one long straight edge and one curved edge each, have rivet holes 81. They are attached together via crossover 85 with a circular arc recess to receive and locate continuous tether fiber 61 between engagement elements 62. If crossover 85 is moved to the straight edge of flanges 80, or if side notches are formed in the regions of crossover 85 toward the straight edge, either of these changes would make it possible to fabricate each double outer link 76 by a die punch process which punches the entire shape and then bends it into a finished double link. Another alternative for double link 76 is to substitute two single links with one half of crossover 85 attached (as cut at the apex of the curved section shown in FIG. 6); the two halves would function identically as double link 76. Note that straight edges of double link 76 capture and locate engagement elements 62 while tether fiber 61 is located within crossover 85 whenever tether 60 is within the central region of pass-through PTO 15 as defined by the two adjacent chain linear portions. Crossovers 85 serve the function of chain nibs 21 shown in FIG. 2 transferring power from modified tether 60 to output gears 20.

Since tether fiber 61 has some elastic stretch which is significantly greater than any exhibited by roller chains 70 and 71, the pitch of engagement elements 60 in modified tether 62 is slightly shorter than that of twice the chain pitch length (2×PL). The no-load pitch of modified tether 60 will stretch to exceed that of the roller chains at maximum load, but it will be constrained to chain pitch length within the region of engagement. In this way, although single element loading between tether and chain occurs at low tension, multiple element loading prolonging element life is encountered as tension load increases. This is illustrated schematically in FIG. 7 where one-sided engagement between elements 62 and crossovers 85 is shown at three levels of tether tension. Note single element loading at A with gaps G1, G2, and G3 because of the shorter pitch of tether 60. At B, two element loading is illustrated; at C, tether pitch is stretched to be equal to chain pitch within the entire engagement region.

FIG. 8 shows a third embodiment of pass-through PTO of this invention based on the use of two pairs of modified double-sided timing belts. Timing belts 29 have engagement elements 30 periodically molded onto the base reinforced belt section so that they protrude inwardly 32 to engage timing belt pulleys 27 and 28 and as outward protrusions 31 where they engage a tether such as 33 which has periodic engagement rings 34 attached at the same pitch. Since belts 29 are designed with the same stretch characteristics as tether 33, the pitch of both can be identical. Lower timing belt pulleys 27 are attached to meshed synchronizing gears 26 with their shafts constituting output power connections (PTO). The location of pairs of idler timing belt pulleys 35 is shown schematically. These should be flanged to locate belts 29 laterally.

FIG. 9 is an enlarged view of a section of belt 29. Engagement elements 30 with inward pulley-engaging protrusions 32 and outward protrusions 31 with concave features to engage with modified tether 33 are shown. While a loose fit of tether 33 within the pair of facing concave outward protrusions 31 is sufficient if the engagement is synchronous using engagement rings 34 (see FIGS. 10 and 11), an asynchronous engagement method on an unmodified or modified smooth tether would require the concave surfaces to squeeze and elastically deform the tether slightly (ie. grasp the tether). In FIGS. 10 and 11, modified tether is revealed to include a high strength fiber core 36 overmolded with a thin tubing layer 33 and periodic engagement rings 34 that would engage concave protrusions 31 from the top or bottom side much as protrusions 32 are engaged in the grooves of a timing belt pulley. For asynchronous use, a modified tether with an overmolding of tubing 33 of polyurethane (but without engagement rings 34) would provide a high friction wear resistant surface with a desirable resilient reaction to squeezing in the transverse direction.

FIG. 12 illustrates six methods of handling the end of the tether that is below the pass-through PTO and therefore under no tension. In A, B, and C, a pass-through PTO 40 is shown schematically as two adjacent ovals with tether 41 running through it. A simply shows a bin 45 to catch the tether 41 end as it is rewound; it is withdrawn from bin 45 during the power stroke. In B, a light weight drum 46 is used to wind and unwind the tether 41 end as needed using a low power winding motor (not shown). If tether end 41 is modified and unmodified tether above does not engage PTO 40 (passes loosely through it), drum 46 can be sized to wind the entire length of tether under low tension as would be used with a closed airfoil during a reefing operation.

In FIGS. 12C-F, rigid hollow tube structures are shown that can hold the short "stroke length" end of modified or unmodified tether. Since large crossection tether has some rigidity, it can be pushed into these hollow rigid tubes when being rewound by the pass-through PTO. Straight pipe 47 in shown at C, while flat serpentine 48 with gentle end curvatures is at D. A flat spiral 49 is shown at E and a helical structure 50 at F. Storage structures as hollow rigid tubes of other shapes conformable to the space constraints of the platform in use can also be configured as long as tether can be pushed into them and withdrawn without kinking or excessive friction.

Figure 13:
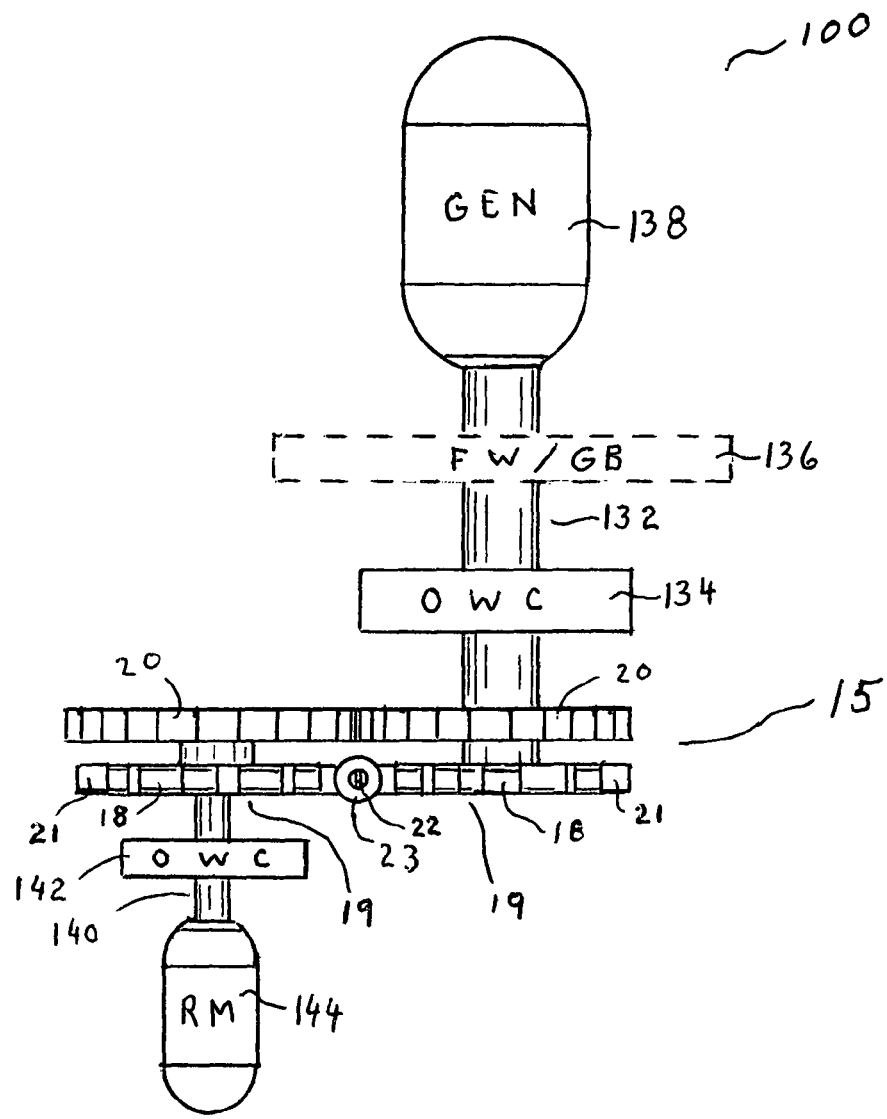
FIG. 13 is a top view showing the pass-through PTO of FIG. 2 integrated into a power conversion subsystem.

FIG. 13 shows a possible system configured around the use of pass-through PTO 15. Both shafts of synchronizing gears 20 are used to couple devices. Two one-way clutches (OWC) are used to isolate devices from shafts during different phases of operation to minimize parasitic losses. OWC 134 isolates optional flywheel/gear box (or transmission) 136 from the power output shaft during the rewind phase, but it permits attachment in the power stroke phase to turn electrical generator (AC or DC) 138. A smaller output shaft on the other gear 20 is connected to OWC 142 which selectively attaches to shaft 140 on rewind motor 144 which turns PTO 15 in the reverse direction to pull down tether 22 in that phase of the operation. This is just one example of a method to use a pass-through PTO of this invention in an electrical power generating system.

In the foregoing description, certain terms and visual depictions are used to illustrate the preferred embodiments. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A pass through power take-off (PTO) arrangement for renewable energy systems comprising a power take-off (PTO) mechanism engaged with a tether over a defined linear region to limit point source stress loading of both said tether as well as said power take-off (PTO) mechanism, said tether attached to an element extracting energy from naturally occurring fluid flows wherein said tether passes linearly through said PTO mechanism thereby converting power from respective linear motion of said tether under tension into rotary power readily utilized for useful purpose;
   wherein said linear region is defined by adjacent loops of flexible power transmitting elements stretched taunt on compatible wheel elements on either side of said tether and wherein said engagement is comprised of at least one of surface friction and multiple mechanical points of interface, between said tether and said adjacent loops.

2. A PTO arrangement as in claim 1 wherein said fluid flow is comprised of air in motion and said energy extracting element is at least one airfoil.

3. A PTO arrangement as in claim 1 wherein said fluid flow is comprised of water in motion and said energy extracting element is at least one fluid submerged element placing said tether under tension by engagement of said fluid flow.

4. A PTO arrangement according to claim 1, wherein the untensioned said tether end section under said PTO mechanism is permitted to fall into and be retrieved from a bin placed in an area to receive it.

5. A PTO arrangement according to claim 1, wherein the untensioned said tether end section is wound onto a reel with the aid of a motor and retrieved from it during a power stroke.

6. A PTO arrangement according to claim 1, wherein the untensioned said tether end is pushed into any rigid hollow tubing structure of appropriate diameter and lacking sharp bends by action of said PTO mechanism during a rewind phase and then pulled from it during the power stroke.

7. A PTO arrangement according to claim 1, wherein said PTO mechanism is integrated into an electrical power generating subsystem comprising:
   an output shaft attached to an output gear of said PTO mechanism, said output shaft attached to a transmission through a one-way clutch, said transmission driving an electrical generator;
   an input shaft attached to a different output gear of said PTO mechanism, said input shaft attached through a one-way clutch to a rewind motor;
   both said one-way clutches coupling and de-coupling attached devices appropriately depending on phase of operation as a power or a rewind stroke to reduce parasitic losses.

8. A pass through power take-off PTO arrangement for renewable energy systems comprising a power take-off (PTO) mechanism engaged with a tether attached to an element extracting energy from naturally occurring fluid flows wherein said tether passes linearly through said PTO mechanism thereby converting power from respective linear motion of said tether under tension into rotary power readily utilized for useful purpose;
   a pair of adjacently located timing belts engaged in timing belt pulleys positioned on either side of said tether, each said belt having a top pulley and a bottom pulley;
   said bottom pulleys of each said timing belt coaxial with and attached to meshed gears with shafts thereby synchronizing the movement of said timing belts;
   one or more pairs of idler timing belt pulleys urging outer surfaces of said timing belts against an outer surface of said tether,
   said tether moving under tension through two said timing belts transferring tension and motion to said timing belts by contact friction against said outer surfaces;
   motion of said timing belts turning said bottom timing belt pulleys along with attached meshed gears and shafts;
   said shafts providing power output connections to external loads of rotary power.

9. A PTO arrangement according to claim 8, wherein said outer surfaces of said two timing belts are enhanced to increase contact friction against said tether surfaces.

10. A PTO arrangement according to claim 8, wherein said tether is surface enhanced to increase contact friction against said outer surfaces of said timing belts.

11. A PTO arrangement according to claim 10, wherein said outer surfaces of said two timing belts are enhanced to increase contact friction against said tether surfaces.

12. A pass through power take-off PTO arrangement for renewable energy systems, comprising: a power take-off (PTO) mechanism engaged with a tether attached to an element extracting energy from naturally occurring fluid flows wherein said tether passes linearly through said PTO mechanism thereby converting power from respective linear motion of said tether under tension into rotary power readily utilized for useful purpose;
   a pair of adjacently located roller chain loops engaged in sprockets positioned on either side of said tether, each said roller chain loop having a top and a bottom sprocket;
   said bottom sprockets of each said roller chain loop coaxial with and attached to meshed gears with shafts thereby synchronizing the movement of said roller chain loops;
   said tether modified with periodically attached tether engagement elements;
   said roller chain loops enhanced with periodically attached chain engagement elements;
   said tether moving under tension through two said roller chain loops transferring tension and motion to said roller chain loops by contact of at least one tether engagement element with at least one chain engagement element;
   motion of said roller chain loops turning said bottom sprockets with attached meshed gears and shafts;
   said shafts providing power output connections to external loads of rotary power.

13. A PTO arrangement according to claim 12, wherein pitch of said tether engagement elements on said modified tether is less than the pitch of said chain engagement elements when said modified tether is under no tension, to compensate for elastic stretch of said modified tether under tension.

14. A PTO arrangement according to claim 12, wherein said chain engagement elements are crossover elements attached to roller chain outer link flanges thereby forming double outer links.

15. A PTO arrangement according to claim 14, wherein said crossover elements have a central recess to capture and locate the fiber portion of said modified tether centrally in a direction transverse to said two roller chain loops.

16. A pass through power take-off PTO arrangement for renewable energy systems, comprising: a power take-off (PTO) mechanism engaged with a tether attached to an element extracting energy from naturally occurring fluid flows wherein said tether passes linearly through said PTO mechanism thereby converting power from respective linear motion of said tether under tension into rotary power readily utilized for useful purpose;
- a pair of adjacently located double-sided timing belts engaged in timing belt pulleys positioned on either side of said tether, each said belt having a top pulley and a bottom pulley;
- said bottom pulleys of each said timing belt coaxial with and attached to meshed gears with shafts thereby synchronizing the movement of said double sided timing belts;
- said double-sided timing belts having periodic inner facing protrusions and outer facing protrusions wherein said outer facing protrusions are formed into tether engaging elements;
- said tether transferring tension and motion to said two double-sided timing belts through engagement with said outer facing protrusions;
- motion of said double-sided timing belts turning said bottom timing belt pulleys along with attached meshed gears and shafts;
- said shafts providing power output connections to external loads of rotary power.

17. A PTO arrangement according to claim 16, wherein said engagement of said tether and said double-sided timing belts is synchronous with said outer facing protrusions locating said tether within facing concave outer surfaces on each of said double-sided timing belts while periodic protruding elements molded onto said tether engage upper or lower sides of said outer facing protrusions.

18. A PTO arrangement according to claim 17, wherein the elastic stretch characteristics of said two double-sided timing belts are designed to be compatible with the stretch characteristics of said tether as modified with said periodic protruding elements such that the pitch of said tether protruding elements are set at the same pitch as the pitch of the said outer facing protrusions of said double-sided belts.

19. A PTO arrangement according to claim 16, wherein said engagement of said tether and said double-sided timing belts is asynchronous with said outer facing protrusions grasping said tether within facing concave outer surfaces on each of said double-sided timing belts, said tether having smooth outer surface without protrusions.

20. A PTO arrangement according to claim 19, wherein said smooth outer surface of said tether comprises a polyurethane sleeve over-molded onto a high strength tether fiber core thereby enhancing the friction coefficient and transverse elastic compressibility as compared to an unmodified tether optimizing the grasping capability of said concave outer surfaces.

* * * * *